COATING OR PLASTIC.
Patented Dec. 4, 1934

1,983,022

UNITED STATES PATENT OFFICE 1,983,022

ACOUSTICAL PLASTER

Leslie B. Eaton, Los Angeles, Calif., assignor to Kalite Company, Limited, Pasadena, Calif., a corporation of California No Drawing. Application August 19, 1933, Serial No. 685,856

9 Claims. (Cl. 72—17)

This invention relates to improvements in acoustical plasters and it particularly relates to a plaster having high sound absorbing properties for wall coverings, and similar purposes. It is a continuation in part of my copending application Serial No. 578,615, filed December 2, 1931.

I have heretofore produced an acoustical plaster having interconnecting pores extending throughout the thickness of the plaster and opening into the surface film, which plaster has a higher sound absorbing efficiency than any other mechanically mixed and non-effervescing plaster heretofore known. I have also discovered that it is possible to apply a coating of acoustical plaster which is also porous and has an improved acoustical effect and higher absorptive coefficient of sound absorption, but at the same time is of sufficiently fine texture to produce a substantially smooth outer surface as contrasted with the normal acoustical products which have an uneven and pitted surface.

I have now produced a fine textured acoustical plaster which is formed of aggregate which may be ground as fine as minus 20 to plus 100 mesh and when mixed with a cementitious binder and an albuminous agent and water will have a high coefficient of sound absorption. And even though the finish coat is trowelled to a smooth hard finish it will not block up but will add to the advantageous sound absorptive efficiency of the under coats of acoustical plaster. Such a product may also be used as the under or brown coat after being applied either to a hardwall base or acoustic scratch coat. Under such conditions the wall coating will have increased sound efficiency comparable to other acoustic plasters heretofore developed by me. The finish coat is preferably applied to the undercoat acoustical plasters in thicknesses of approximately one-half inch.

Other features and advantages of my new plaster will appear from the following description thereof which describes a preferred form of mixture which has proved to be highly effective in use.

The acoustical plaster in its preferred form has as its principal ingredient a finely ground aggregate which may be either mineral or fibrous such as sawdust, shredded cane fiber or coke breeze, although light porous materials such as pumice as normally found in volcanic California deposits is preferred. The aggregate is preferably ground to minus 20 to plus 100 mesh or finer and is mixed with a cementitious binder such as Portland cement or calcined gypsum plaster. The plaster is preferred.

A preferable mixture consists of four parts by volume of the aggregate to one part by volume of the gypsum plaster or two parts of the pumice aggregate to one part of the gypsum plaster by weight. To a batch of 7¼ pounds of such a mixture is preferably added an albuminous frothing agent including egg albumen and blood albumen. Yellow corn dextrine is also preferably added as a hardener in substantially the relative proportions of three grams of egg albumen with six grams of blood albumen and 28 grams of yellow corn dextrine. The dextrine improves the setting properties of the plaster.

On a percentage by weight basis, the preferred formula has 1,000 parts of aggregate-plaster mixture of 2 parts aggregate to 1 part plaster by weight; to which is added approximately 8.6 parts of corn dextrine hardener, and from 0.9 to 14.0 parts albumen which is preferably 1 part egg to 2 parts blood albumen.

The albumen proportions may be varied from as little as one gram of egg albumen and two grams of blood albumen to as much as 15 grams of egg albumen and 30 grams of blood albumen. The lower values are preferable because of the reduced cost and substantially satisfactory results. The dextrine hardener is one that has proved satisfactory although other hardeners are available.

A suitable amount of water is mixed to produce plasticity suitable for application on walls, ceilings and the like with ordinary plastering tools. The finish coat may be thoroughly trowelled to a smooth hard finish and is found on repeated tests to have a coefficient of sound absorption of 36% or over at 512 double vibrations for a thickness of one-half inch. This is when it has been applied over a base of ordinary hard wall plaster which has a notoriously low coefficient of sound absorption.

This plaster may be applied to any base or undercoat although most effective acoustic properties will be found when applied in two coats, the browning coat and finish coat each having an aggregate which is preferably ground to approximately minus 20 mesh to which ordinary gypsum or stucco plaster may be added as a binder. As described with the finish coat, the proportion of three or four parts of pumice or light aggregate to one part of gypsum by weight is also preferred for the undercoat. It may be desirable in some cases to apply the plaster over a scratch coat and where a scratch coat is used it may desirably have the coarser aggregate such as minus 5 to plus 30 mesh. The subsequent coats however, are preferably of minus 20 mesh aggregate.

The plaster is plastic and can be easily applied to curved surfaces and run into molds and as it is made without hair, felt or fiber and preferably has a mineral base it is vermin and germ proof. Furthermore, as the mixture is mechanically made without recourse to chemicals which effervesce there is nothing in the mix that will spoil and extreme rapidity of application is unnecessary. The plaster may therefore be handled in the usual manner of any gypsum plaster.

For convenience in application and in shipment the materials including the aggregate, cementitious binder and albumens are mixed and shipped to the job in a dry form. It is therefore only necessary at the job to add the proper amount of water to secure the desired plasticity.

It is my belief that the high sound absorbing efficiency of my acoustical plaster is due to its surface porosity and to the fact that the inner pores or cavities are 100% intercommunicating from front to back of the plaster so that sound waves entering the surface pores are reverberated through the labyrinth of sub-surface cavities until they are absorbed. The frothing agent materially assists in forming these inner pores and although a finer and more dense aggregate is used for the surface or finish coat, the previously entrapped air bubbles dry and disintegrate, thus forming completely intercommunicating pores throughout the material.

While I am aware that modifications may be made to the formula of the product set forth, it is to be understood that the product is a preferred one and that certain modifications may be made thereto within the scope and spirit of this invention, and I therefore desire a broad interpretation of this invention within the scope and spirit of the description thereof and of the claims appended hereinafter.

I claim:

1. An acoustical plaster for a wall surface which comprises a finely ground mineral aggregate, ground to a fineness of minus 20 to plus 100 mesh, a plaster binder, an albuminous frothing agent, and a dextrine hardener.

2. A dry mix plaster product which comprises approximately ⅔ of pumice aggregate ground to minus 20 to plus 100 mesh, ⅓ of a calcined gypsum plaster, egg albumen and blood albumen in the relative proportion of 2 parts of blood albumen to 1 part of egg albumen, and a dextrine hardening agent, said products being mixed dry and when rendered plastic by the addition of water, forming a plastic coat applicable to a wall surface by ordinary plastering tools and when trowelled to a smooth surface finish having a sound absorption in excess of 30% at 512 double vibrations in a thickness of ½ inch.

3. An acoustical plaster finish coat applicable by ordinary hawk and trowel methods, comprising an aggregate, a binder, an albuminous frothing agent, a hardening agent and water, the aggregate being ground to a fineness of the order of minus 20 mesh, said coat when trowelled having a smooth surface which on drying will have a hard microscopically porous sound absorptive structure from front to back thereof with intercommunicating pores.

4. An acoustical plaster surface applicable by hawk and trowel methods in a plurality of coats, each of said coats comprising a finely ground aggregate, a cementitious binder and water forming a porous structure, and an albuminous frothing agent, the final and browning coats having a relatively more finely ground aggregate than the scratch coat, said final coat when dry having a cellular, porous, sound absorptive structure from front to back thereof with intercommunicating pores, said finish coat having a trowelled, smooth, hard and microscopically porous surface.

5. An acoustical plaster surface applicable by hawk and trowel methods in a plurality of coats, each of said coats comprising an aggregate, a plaster binder, an albuminous frothing agent, a hardening agent and water, and final and browning coats having a relatively more finely ground aggregate than the scratch coat, each of said coats when dry having a cellular, porous, sound absorptive structure from front to back thereof with intercommunicating pores, said finish coat having a trowelled, smooth, hard and microscopically porous surface.

6. A dry mix acoustical plaster product which comprises in a 1,000 parts by weight batch of two-thirds ground pumice aggregate to one-third calcined gypsum plaster by weight, an albuminous frothing agent including from between 0.3 parts of egg albumen and 0.6 parts of blood albumen to 4.5 parts of egg albumen and 9.0 parts of blood albumen, said product when gaged with water and applied as a wall coating having a porous sound absorptive quality.

7. A scratch coat of plaster which comprises a ground aggregate of the order of minus 5 mesh, a cementitious binder, an albuminous frothing agent and a hardening agent, said product when dry having a cellular, porous structure from front to back thereof with a relatively high degree of sound absorption.

8. A browning coat of plaster which comprises an aggregate ground to the order of minus 20 mesh, a cementitious binder, an albuminous frothing agent, a hardening agent, and water, said product when dry, having a porous surface from front to back and relatively high degree of sound absorption.

9. A finish coat of acoustical plaster for a wall surface which comprises a finely ground aggregate, a plaster binder and an albuminous frothing agent, said product when dry and trowelled to a smooth surface having a microscopically porous surface and a coefficient of sound absorption of 36% at 512 double vibrations in a thickness of ½ inch.

LESLIE B. EATON.